(No Model.)

W. G. TILLOU & J. W. CLAPP.

HARNESS MOTION FOR LOOMS.

No. 290,286. Patented Dec. 18, 1883.

2 Sheets—Sheet 2.

Witnesses
Thd Haynes
Ed L. Moran

Inventors
Walter G. Tillou
John W. Clapp
by their Attorneys
Brown & Brown

United States Patent Office.

WALTER G. TILLOU AND JOHN W. CLAPP, OF NEW HAVEN, CONNECTICUT, ASSIGNORS, BY DIRECT AND MESNE ASSIGNMENTS, TO CHARLES I. KANE AND ROBERT E. LESTER, BOTH OF NEW YORK, N. Y.

HARNESS-MOTION FOR LOOMS.

SPECIFICATION forming part of Letters Patent No. 290,286, dated December 18, 1883.

Application filed October 9, 1882. (No model.)

*To all whom it may concern:*

Be it known that we, WALTER G. TILLOU and JOHN W. CLAPP, citizens of the United States, both of the city and county of New Haven, in the State of Connecticut, have invented a new and useful Improvement in Harness-Motions for Looms, of which the following is a specification.

Our invention is more especially designed for use with small looms, several of which are arranged in line and driven by one main shaft running through the whole series of looms. It may, however, be applied to other descriptions of looms.

The object of our invention is to facilitate the changing of the order of working the harness with the least possible change in the parts of the harness-motion.

In carrying out our invention we employ a vertical shaft driven by a bevel-wheel operated by a bevel-wheel of smaller diameter mounted on the shaft for operating the lay and shuttle motions, which shaft, by means of gear-wheels and a suitable clutch-motion, is operated by the main shaft. Upon the vertical shaft is mounted a series of cams composed of flanged cylinders having removable sections so applied between the flanges that when the said sections are arranged in one order they shall produce cam-grooves adapted to operate the heddles so as to produce plain weaving, while by other arrangements of the sections cam-courses will be formed adapted to produce four-leafed twill, gros-grain, or other descriptions of weaving, as desired. The treadles are pivoted, so as to be capable of swinging in vertical planes, and have their ends engaging directly with the heddle-frames, and they carry bowls or rollers which run in the cam-courses of the cams on the vertical harness-shaft. The vertical or harness shaft may be variously speeded in relation to the shuttle-driving shaft, according to the number of divisions in the cam or number of sections of which it is composed.

The accompanying drawings form part of this specification, and illustrate what we consider the best means of carrying out the invention.

Figure 1:
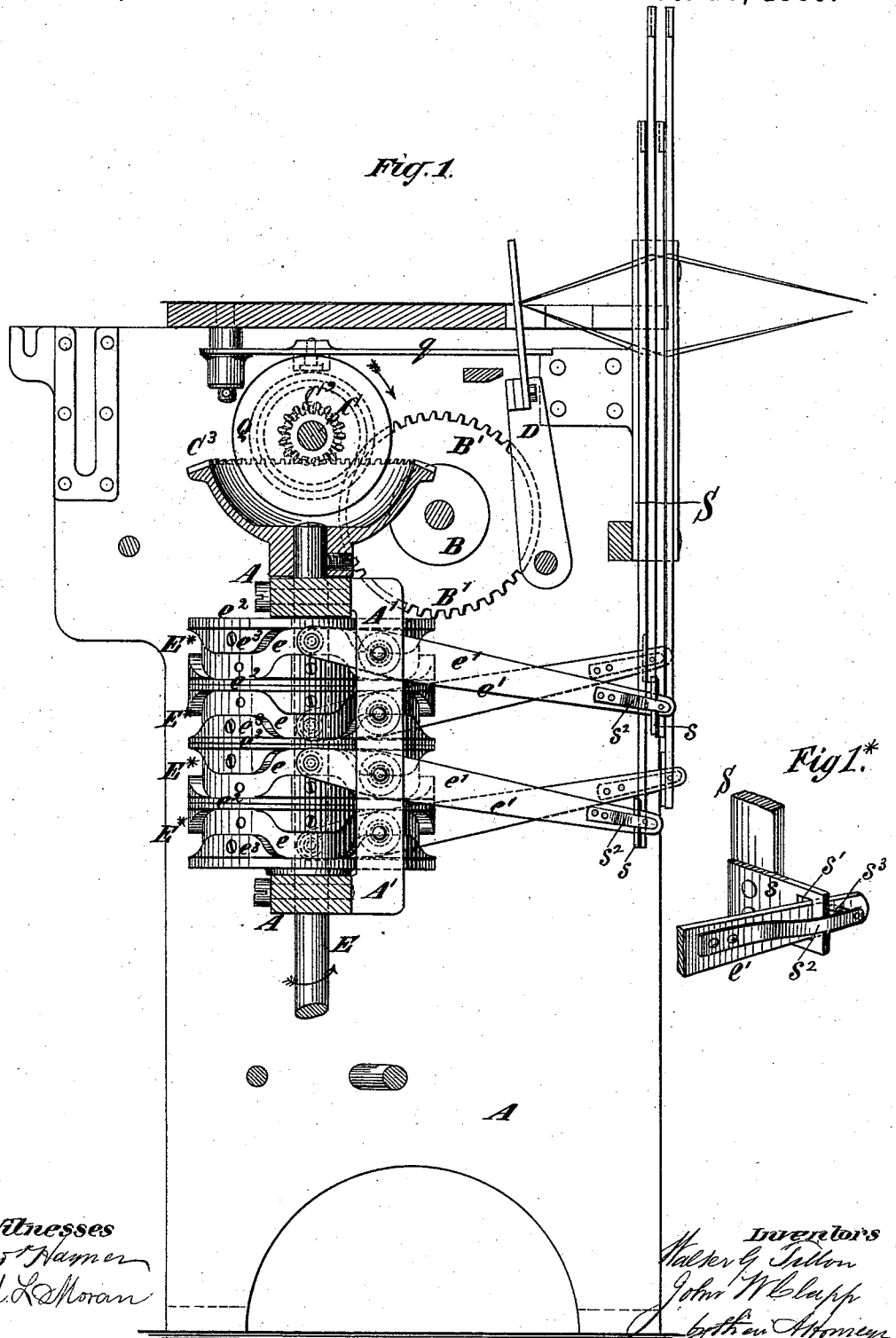
Figure 2:
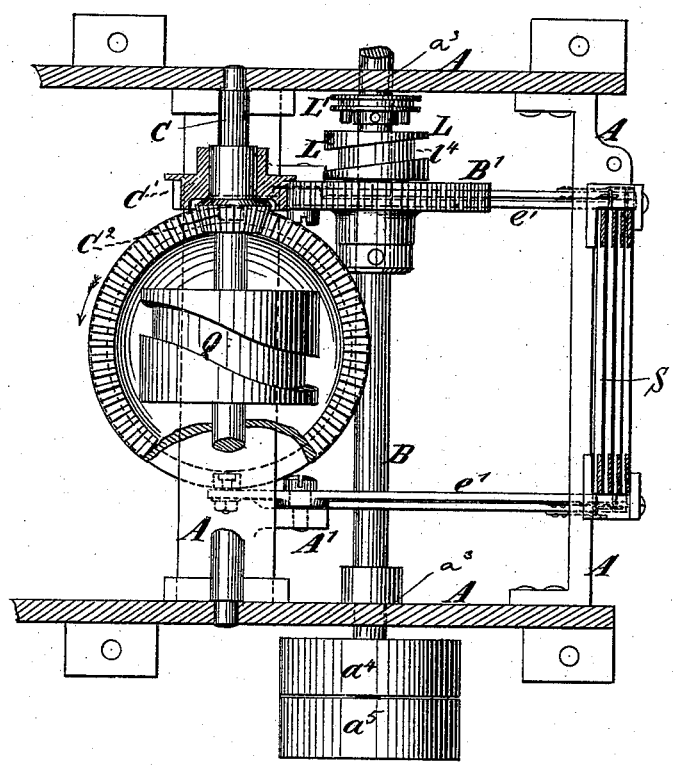
Figure 3:
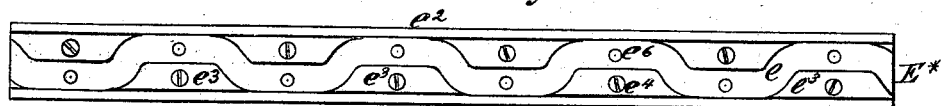
Figure 4:
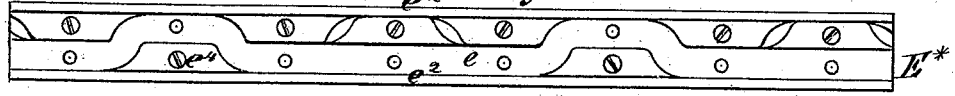
Figure 5:
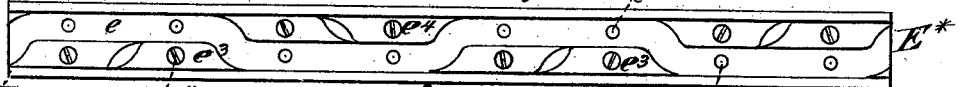
Figures 6, 7:

Figure 1 is a vertical section of so much of a loom as will illustrate the invention. Fig. 1* is a detail perspective view on a larger scale, showing how the treadles are connected with the heddle-frames. Fig. 2 is a horizontal section of the same with the upper working parts removed. Fig. 3 is a diagram showing the surface of one of the cams laid out in a plane with its sections arranged to produce plain weaving. Fig. 4 is a similar diagram, representing the sections arranged to produce four-leaf twill. Fig. 5 is another diagram, showing the sections arranged for producing gros-grain. Figs. 6 and 7 are perspective views of two forms of sections which we have shown employed in Figs. 3, 4, and 5.

In each of the views similar letters of reference are employed to indicate corresponding parts wherever they occur.

A is the main framing, and B the driving-shaft, which is mounted in bearings $a^3$ $a^3$, formed in the main framing A, and provided with a fast driving-pulley, $a^4$, and loose pulley $a^5$. Upon the main shaft B is mounted a wheel, B', which, when connected with the shaft B by means of the double clutch L, operates the wheel C', mounted on the shaft C, which actuates the mechanism for operating the lay D and the shuttle-motion, and imparts motion, as hereinafter explained, to the vertical shaft E, upon which the cams E* are mounted. The cam $l^4$ of the clutch L actuates the warp stop-motion. The shuttle and warp stop-motion, however, form no part of the present application, and are simply referred to in so far as is necessary to illustrate the present invention.

The shuttle mechanism forms the subject of our application for Letters Patent filed June 8, 1881, of which the serial number is 35,208; and the warp stop-motion, including the cam L, forms the subject of our application for Letters Patent filed October 9, 1882, of which the serial number is 73,829.

Upon the shaft C is mounted a bevel-wheel,

C², which gears into a bevel-wheel, C³, the body of which is bowl-shaped, so as to allow of the free action of the cam Q for operating the lever q, by means of which the shuttle is actuated.

Upon the shaft E is mounted a series of cam-cylinders, E*, each of which is provided with flanges $e^2$ $e^2$, between which are placed a series of sections, $e^3$, so arranged as to form a cam-course, $e$, adapted to receive and operate a truck or bowl mounted on the short end $e^4$ of one of the harness-treadles $e'$, which are pivoted to a vertical bar, A', forming part of the main framing A.

S designates the heddle-frames, to which the ends of the treadles $e'$ are directly connected in any suitable way. In this example of our invention each heddle-frame S has projecting from it a lug or ear, $s$, (best shown in Fig. 1*,) in which is a slot, $s'$, and the treadle $e'$ is inserted in this slot and secured by a catch consisting of a spring, $s^2$, and a pin, $s^3$, which enters a hole in the treadle. The treadle may be detached by deflecting the spring $s^2$ outward sufficiently to permit the treadle to be withdrawn from the slot $s'$.

In the drawings, Figs. 1, 2, and 3, we have shown our improved devices arranged for producing plain weaving, in which case the sections $e^3$ are arranged at equal distances apart and alternately on the opposite sides of the space on each cylinder E*, between the flanges $e^2$, so as to form a course $e$ which will give a regular up-and-down motion to the alternate treadles for every pick of the loom. The cylinders E*, as shown in the drawings, are arranged with eight divisions and eight sections $e^3$, each of which is secured in the position desired by means of countersunk screws $e^4$, which pass through holes $e^5$ and are received into holes $e^6$, tapped in the cylinders E*. There are sixteen holes, $e^6$, shown tapped in each cylinder E*, one-half only of which are in use at the same time. In Figs. 1 and 3, the sections $e^3$ being arranged alternately on opposite sides for the production of plain weaving, alternate holes $e^6$ are used and vacant. In Fig. 4 the sections $e^3$ are shown as arranged three together on the top side of the cylinder E*, with one section interspaced on the lower side, so as to form a cam-course which will so operate the heddles that three heddles will always be up and one down, for the purpose of producing four-leaf twill. Two holes $e^6$ on the top side and six holes on the lower side are vacant, while the remainder are employed to hold the sections $e^3$ in place. Four cams will be required, as in Fig. 1, all with sections arranged as in Fig. 4. In Fig. 5 we have shown the cylinder E* with the sections $e^3$ arranged two together alternately on opposite sides to form a cam-course which will so operate the heddles that two will always be up and two down, for the purpose of producing gros-grain, in which case every alternate two of the holes on each side are occupied and vacant. Four cams will be required, each with the sections arranged as in Fig. 5. In order to provide for adapting the cams to weave any kind of goods, some of the sections must have their ends inclined in opposite directions, as shown in Fig. 6, while others of the sections must have both their ends inclined in the same direction, as shown in Fig. 7. The reason for this will be seen from the drawings. In Fig. 4, where the sections are arranged three together on one side, the middle section of the three is reversed, so that the sections will form a continuous wall or side to the cam-course, and for this form of cam each section should have its ends inclined in reverse directions. In Fig. 5, where the sections are arranged two together, it would be impossible to form a cam-course of the sections shown in Fig. 6 alone, and we must use for each pair a section of the form shown in Fig. 6 and a section of the form shown in Fig. 7. The manner of combining the two sections of the forms shown in Figs. 6 and 7 so as to properly form the cam-course will be understood from Fig. 5. As before stated, the cylinder E* has eight divisions, and the length of each peripherical section from the middle of the incline at one end to the middle of the incline at the other end is exactly equal to one of the divisions of the cylinder or to one-eighth of its circumference. The sections can therefore be easily arranged to form cam-courses of a number of forms. Other number of divisions of the cylinder and other number of sections $e^3$ can be employed, so long as the number is made to agree with the motions of the shuttle and lay.

We are aware that it is not new to operate treadles by means of cams on a vertical harness-shaft, and we are also aware that it is not new to provide a cam for operating a heddle-frame with removable sections, so that by different arrangements of the sections the movements of the heddle-frame may be varied; hence we do not claim these features, broadly, as of our invention.

Having thus described our invention, what we claim, and desire to secure by Letters Patent, is—

1. The combination, with the heddle-frames of a loom, of a vertical harness-shaft, cams on said shaft having grooved peripheries, treadles pivoted so as to swing in vertical planes, having their ends engaging directly with the heddle-frames, and provided with bowls or rollers running in the grooves of said cams, and means for operating said shaft, substantially as shown and herein described.

2. The combination, with a vertical harness-shaft, of one or more cams thereon, each consisting of a cylinder provided with flanges at opposite sides, and interchangeable peripherical sections having inclined ends and detachably secured against said flanges, so as to form a peripherical cam-course, each of the sections being adapted, by changing it end for end, to be secured against either flange for varying the form of the cam-course, substantially as shown and herein described.

3. The combination, with the cam-cylinder E*, provided with flanges $e^2$, of a number of interchangeable peripherical sections, $e^3$, each having inclined ends, and some having both ends inclined in the same direction, while others have their ends inclined in reverse directions, substantially as and for the purpose herein described.

WALTER G. TILLOU.
JOHN W. CLAPP.

Witnesses:
A. C. WETMORE,
F. W. BABCOCK.